April 20, 1948.  W. M. HUSTON  2,440,199
GANTRY STRUCTURE
Filed July 5, 1945  3 Sheets-Sheet 1

April 20, 1948.  W. M. HUSTON  2,440,199
GANTRY STRUCTURE
Filed July 5, 1945  3 Sheets-Sheet 3

INVENTOR.
William M. Huston
BY
Stynestedt & Lechner
ATTORNEYS

Patented Apr. 20, 1948

2,440,199

UNITED STATES PATENT OFFICE 2,440,199

GANTRY STRUCTURE

William M. Huston, Lima, Ohio

Application July 5, 1945, Serial No. 603,380

8 Claims. (Cl. 212—59)

This invention relates to load handling equipment such as cranes, shovels, drag lines and the like, particularly machines of these types adapted to travel on crawler treads. The invention is especially concerned with an improved gantry structure applicable to load handling machines such as those mentioned.

In load handling machines of large size, very heavy compression and tension loads are placed in the gantry structure during various phases of operation, and the present invention is particularly concerned with a novel arrangement of gantry legs and braces adapted to carry the heavy loads encountered in machines of large size.

According to the invention, the gantry structure is, in general, made up of rearwardly and upwardly inclined front compression legs, and generally vertical rear tension legs, the upper portions of the tension legs being of multiple construction and the tension legs further being braced intermediate the gantry headshaft and the rotating base of the machine.

In the preferred gantry structure provided by the invention, the braces for the rear tension legs are extended to the machinery frames which are customarily mounted on the rotating base for the purpose of supporting cable drums, brakes, clutches and the like, employed to perform various functions.

In considering another feature of the invention, it is mentioned that in a large size load handling machine of the type herein contemplated, the gantry structure extends appreciably above the roof of the cab. With this in mind, the invention contemplates employment of a deck or platform mounted on certain of the gantry legs at an elevation appreciably above the roof of the cab so that an attendant may have convenient access to equipment such as sheaves and the like which are customarily mounted on the gantry head-shaft.

How the foregoing and other objects and advantages are attained will appear more fully from the following description referring to the accompanying drawings in which the invention is illustrated as applied to a load handling crane. In the drawings—

Figure 1:
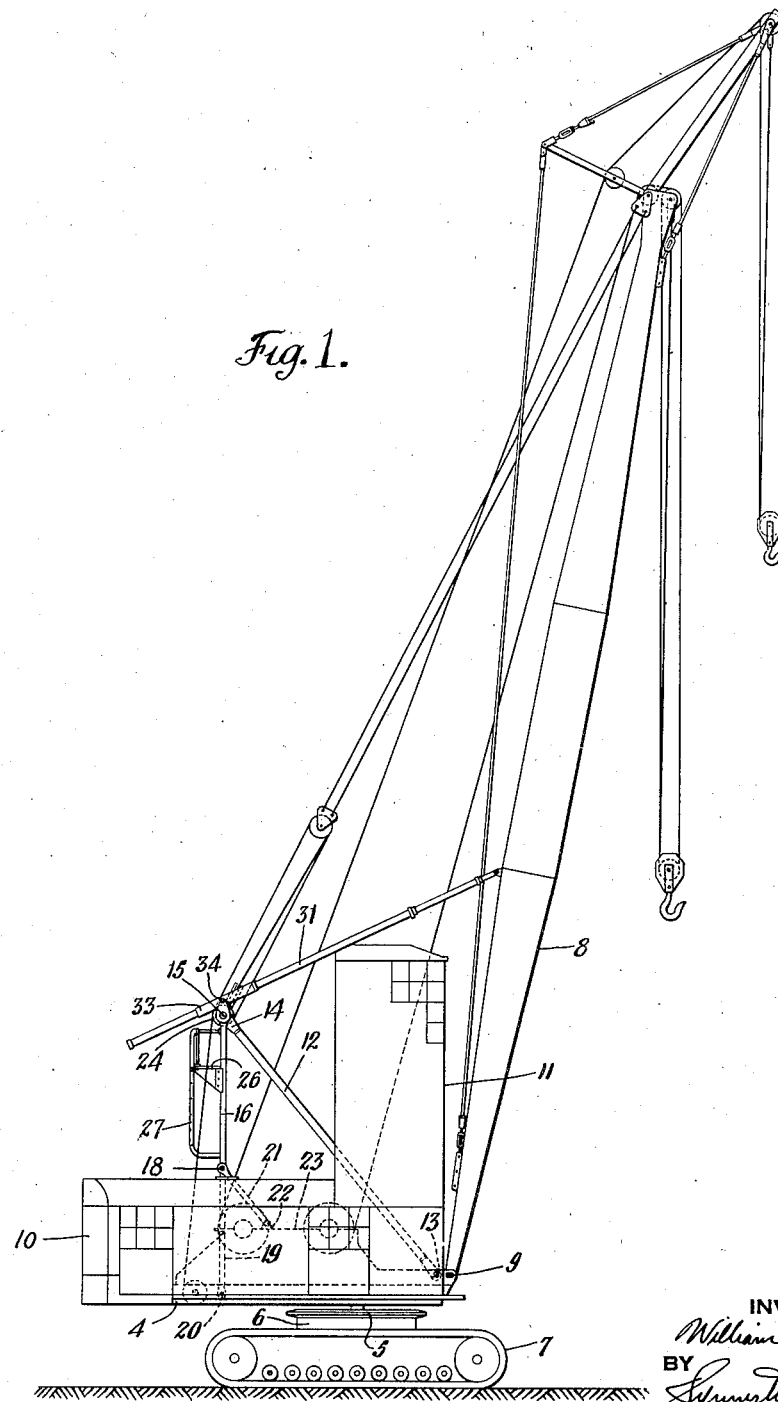
Figure 1 is a side view in outline of a crane incorporating a gantry structure according to the invention.

Referring first to Figure 1, the rotating base 4 of the machine is mounted for swing motion about a vertical axis on the circular track 5 at the top of the crawler truck 6. The crawler truck is equipped with a pair of crawler treads one of which is diagrammatically indicated at 7.

The boom 8 is pivoted to the front end of the rotating base as at 9 to provide for upward and downward swinging movement of the boom. The rotating base carries a cab 10 which houses the power plant and operating machinery for raising and lowering the boom, for driving the crawler treads, and for performing other functions common to cranes. In the particular machine here illustrated, an operator's tower 11 is extended upwardly at one side of the rotating base.

Figure 2:
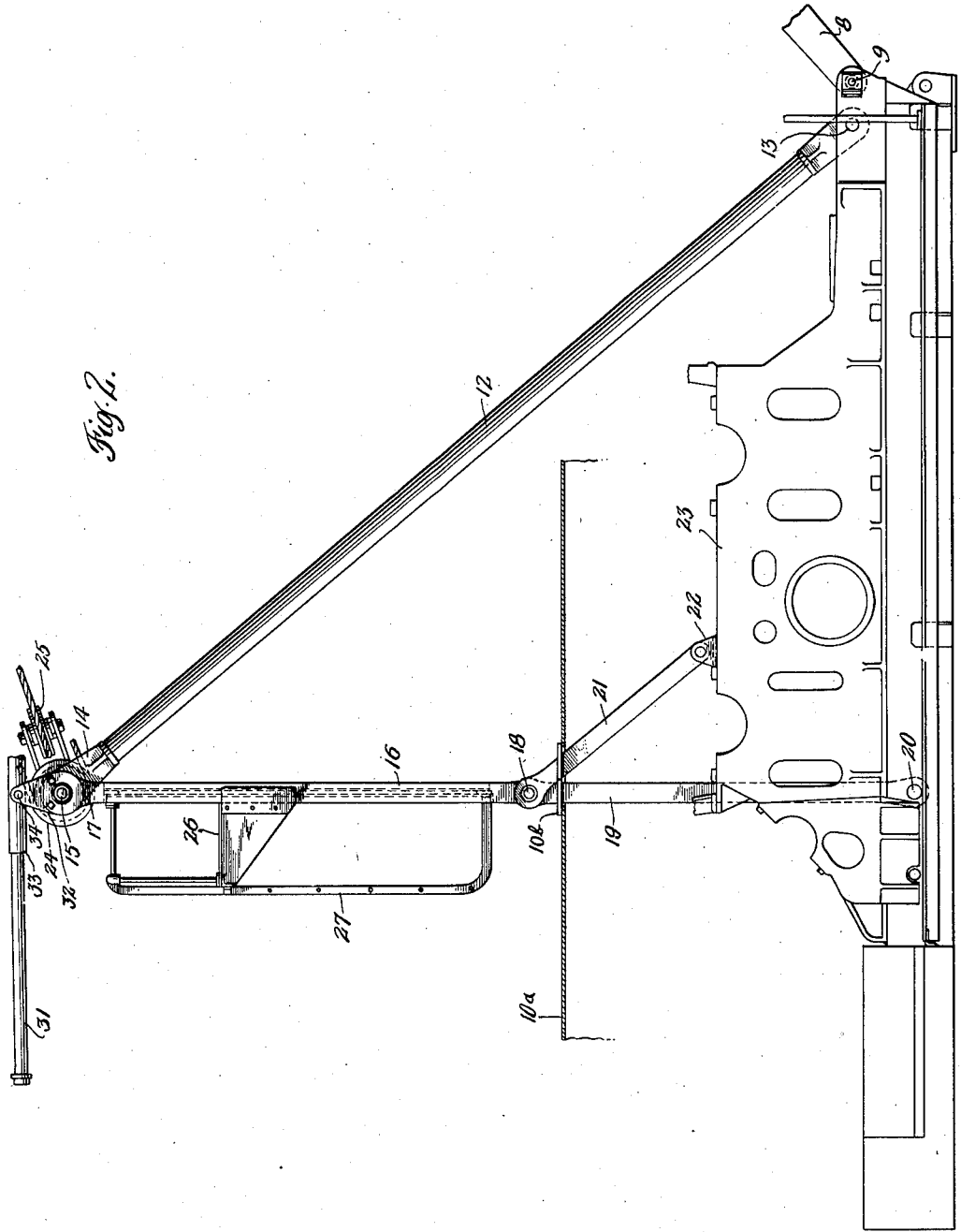
Figure 2 is an enlarged side elevation of the rotating base, machinery frames and gantry structure.
Figure 3:
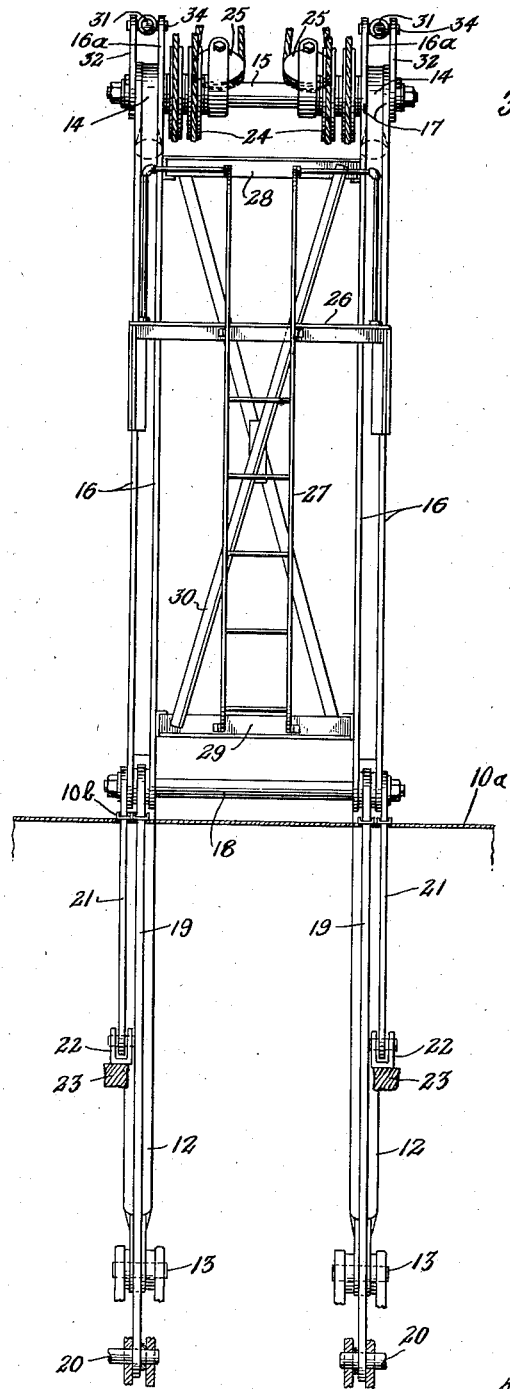
Figure 3 is a rear view of the gantry structure on a further enlarged scale.

The gantry structure is shown in greater detail in Figures 2 and 3 to which reference is now made. The gantry includes a pair of front compression legs 12 which are pinned at their lower ends to the rotating base as at 13 at a point close to the mounting 9 of the boom. The legs 12 are inclined upwardly and rearwardly and at their upper ends are provided with apertured fittings 14 which receive and support the ends of the gantry headshaft 15.

In the upper region of the gantry structure, the rear tension legs are of multiple construction, there being a pair of legs 16 toward each side of the gantry. Each leg 16 of each pair is provided with an apertured eye 17 at its upper end through which the gantry headshaft 15 passes in order to secure the upper ends of the compression and tension legs to each other. The eyes 17 of each pair lie one at each side of the fitting 14 of the associated front compression leg. The tension legs 16 extend downwardly to a point about midway between the gantry shaft 15 and the rotating base, and at that point a transverse shaft 18 is provided, the legs 16 being apertured to receive the shaft. Additional vertical tension elements or legs 19, one arranged at each side of the gantry structure, are also connected with the shaft 18 and extend downwardly therefrom to be pinned to the rotating base as indicated at 20.

The above described multiple rear tension legs of the gantry structure are braced by means of bracing elements 21, one being located at each side and serving to interconnect the transverse shaft 18 and brackets 22 which are secured to the upper edges of the machinery frames 23. From Figure 2 it will be noted that the front legs 12 and the braces 21 extend in substantial parallelism, which factor, together with the triangulated arrangement of the compression and tension legs of the gantry, provides an unusually rigid structure capable of withstanding the heavy loads encountered in machines of large size. The interbracing of the machinery frames and the rear gantry legs is also of advantage from the standpoint of sturdiness of mounting of the operating machinery for the crane or the like.

From Figures 1 and 2 it will be noted that the shaft 18, interconnecting legs 16 and 19 with braces 21, is located just above the roof 10a of the cab, which is of importance in providing convenient access to shaft 18, for purposes of taking down or assembling the gantry, for instance at times of shipment. The employment of upper and lower rear legs 16 and 19 interconnected by shaft 18 also permits partial collapsing of the gantry, which may be accomplished by removal of the pins 13 at the foot ends of the compression legs 12, said foot ends then being drawn forwardly, so as to lower the gantry headshaft. When doing this, the boom stops 31 (described herebelow) may advantageously be disconnected, depending upon the angle to which the boom is lowered and on the extent of collapsing of the gantry desired.

Where the legs 19 and braces 21 pass through the cab roof they carry plates 10b for covering the holes in the cab roof and for preventing water from running down the gantry legs into the cab in rainy weather.

The gantry headshaft serves to support sheaves such as indicated at 24 and 25 over which cables are reeved in passing from boom hoist drums to the point of the boom. Various devices adjacent the gantry headshaft, such as the sheaves just mentioned, require lubrication, repair or other attention from time to time and in order to provide for convenient access to the parts associated with the gantry shaft the invention contemplates mounting a deck 26 at a point a little below the gantry headshaft on which an attendant may stand in lubricating or working on the sheaves, cables or the like associated with the gantry headshaft. Access to the platform 26 is provided for by a ladder 27 which is also supported by the tension legs 16 and extends downwardly to the region of the roof of the cab 10.

Bracing of the gantry structure in a direction transverse the general plane thereof, i. e., laterally of the cab, is provided for by upper and lower cross braces 28 and 29 which interconnect the inner tension legs 16 (see Figure 3), together with diagonal angle braces 30.

Referring again to Figure 1, it will be noted that telescopic boom stop devices 31 are provided, these devices being constructed in accordance with my copending application Serial No. 603,378, filed July 5, 1945, and serving to limit and cushion upward swinging movement of the boom. The telescopic boom stops interconnect the boom with the upper end of the gantry structure. For this purpose, at the gantry head, the two inner tension legs 16 are extended upwardly at 16a above the gantry shaft 15 and a pair of upwardly projecting plate members 32 are also mounted on the gantry shaft just outside the planes of the outer tension legs 16. The plate members 32 ar advantageously fixed as against the swinging movement on the gantry shaft by any suitable means such as bolts. The pairs of parts 16a—32 serve to carry sleeves 33 by means of trunnions 34, the rear portions of the telescopic boom stops being slidable in the sleeves 33.

Although the structure of the boom stops 31 forms no part of the present invention per se, the same being claimed in my copending application identified above, it is to be noted herein that the employment of such boom stops imposes additional loads on the gantry structure, especially at times when the stops come into operation to limit the upward movement of the boom. The gantry of the present invention and particularly the employment of multiple tension legs 16 and bracing elements 21, adequately takes care of the loads encountered, including those arising because of the employment of boom stops interconnecting the boom and the gantry head.

I claim:

1. In a load handling machine having a rotating base carrying machinery frames and a boom, a gantry structure comprising a pair of front compression legs connected with the rotating base adjacent the mounting of the boom on the base and inclined upwardly and rearwardly therefrom, and rear tension legs extended generally vertically between the rotating base and the upper ends of the compression legs, a gantry head-shaft interconnecting the upper ends of the compression and tension legs, and braces connected with the tension legs intermediate the gantry shaft and the rotating base and inclined forwardly and downwardly therefrom toward and connected with the machinery frames.

2. A construction in accordance with claim 1 in which the front compression legs and braces for the rear tension legs extend in approximate parallelism.

3. A construction in accordance with claim 1 in which the braces for the tension legs of the gantry are connected with the machinery frames adjacent the upper edges of the latter.

4. A construction according to claim 1 in which each rear leg of the gantry comprises upper and lower leg members interconnected by a shaft and in which each rear leg brace is connected with the said shaft.

5. In a load handling machine having a rotating base carrying machinery frames and a boom, a gantry structure comprising a pair of front compression legs connected with the rotating base adjacent the mounting of the boom on the base and inclined upwardly and rearwardly therefrom, a pair of rear tension legs connected with the upper end of each compression leg and extending downwardly therefrom in substantially vertical parallel planes offset one toward each side of the main vertical plane of the associated compression leg, and means interconnecting the lower ends of said pairs of tension legs with the rotating base.

6. A construction in accordance with claim 5 and further including braces interconnecting said pairs of tension legs with the machinery frames.

7. In a load handling machine having a rotating base carrying a boom, a gantry structure comprising a pair of front compression legs connected with the rotating base adjacent the mounting of the boom on the base and inclined upwardly and rearwardly therefrom, a pair of rear tension legs connected with the upper end of each compression leg and extending downwardly therefrom in substantially vertical parallel planes offset one toward each side of the main vertical plane of the associated compression leg, and, for each pair of tension legs, a single tension member connected therewith and extending downwardly therefrom to the rotating base.

8. In a load handling machine having a rotating base with a boom mounted thereon for upward and downward swinging movement, a gantry structure comprising a pair of front compression legs having apertured fittings at their upper ends, tension legs having apertured eyes at their upper ends, a gantry headshaft interconnecting said fittings and eyes, and stop means for limiting upward swinging movement of the boom extended and adapted to react between the boom and a tension leg of the gantry.

WILLIAM M. HUSTON.

REFERENCES CITED

The following references are of record in the file of this patent:

UNITED STATES PATENTS

| Number | Name | Date |
|---|---|---|
| 294,395 | Lyman | Mar. 4, 1884 |
| 335,164 | Vitalis | Feb. 2, 1886 |
| 738,080 | Sorensen | Sept. 1, 1903 |
| 1,101,459 | Martinson | June 23, 1914 |
| 1,195,461 | Greene | Aug. 22, 1916 |
| 1,378,981 | Sabin | May 24, 1921 |
| 1,402,291 | Harbinger | Jan. 3, 1922 |
| 2,083,460 | Ljungkull | June 8, 1937 |
| 2,139,960 | Kauffman | Dec. 13, 1938 |
| 2,335,858 | Huston | Dec. 7, 1943 |
| 2,348,285 | Ekbom et al. | May 9, 1944 |